United States Patent [19]

Torrence

[11] Patent Number: 4,595,171
[45] Date of Patent: Jun. 17, 1986

[54] INLINE SOLENOID OPERATED VALVE

[75] Inventor: Robert J. Torrence, Addison, Ill.

[73] Assignee: Controls Company of America, Schiller Park, Ill.

[21] Appl. No.: 754,713

[22] Filed: Jul. 15, 1985

[51] Int. Cl.⁴ .............................................. F16K 31/06
[52] U.S. Cl. ............................ 251/129.07; 251/129.21
[58] Field of Search ....................... 251/129.21, 129.07, 251/129.19, 129.02

[56] References Cited

U.S. PATENT DOCUMENTS 3,470,892 10/1969 Barker .
3,529,806 9/1970 Kozel .
3,592,228 7/1971 Kukuminato et al. ...... 251/129.21 X
3,592,438 7/1971 Greenwood et al. .
3,833,015 9/1974 Kneuer .

FOREIGN PATENT DOCUMENTS 668632 3/1952 United Kingdom ........... 251/129.21

Primary Examiner—Arnold Rosenthal
Attorney, Agent, or Firm—David L. Davis; Edward L. Bell; Robert E. Smith

[57] ABSTRACT

An inline solenoid operated fluid flow control valve includes a plunger housing and a plunger movable against a valve seat and pole piece within the flow line when the solenoid coil is energized. The plunger and plunger housing are axially coupled via a spring which absorbs impact when the plunger strikes the valve seat. A piston within the valve seat member provides a pressure balancing feature and the clearance around the piston provides for a minimum flow when the solenoid coil is energized, with full flow occurring when the solenoid coil is not energized.

4 Claims, 4 Drawing Figures

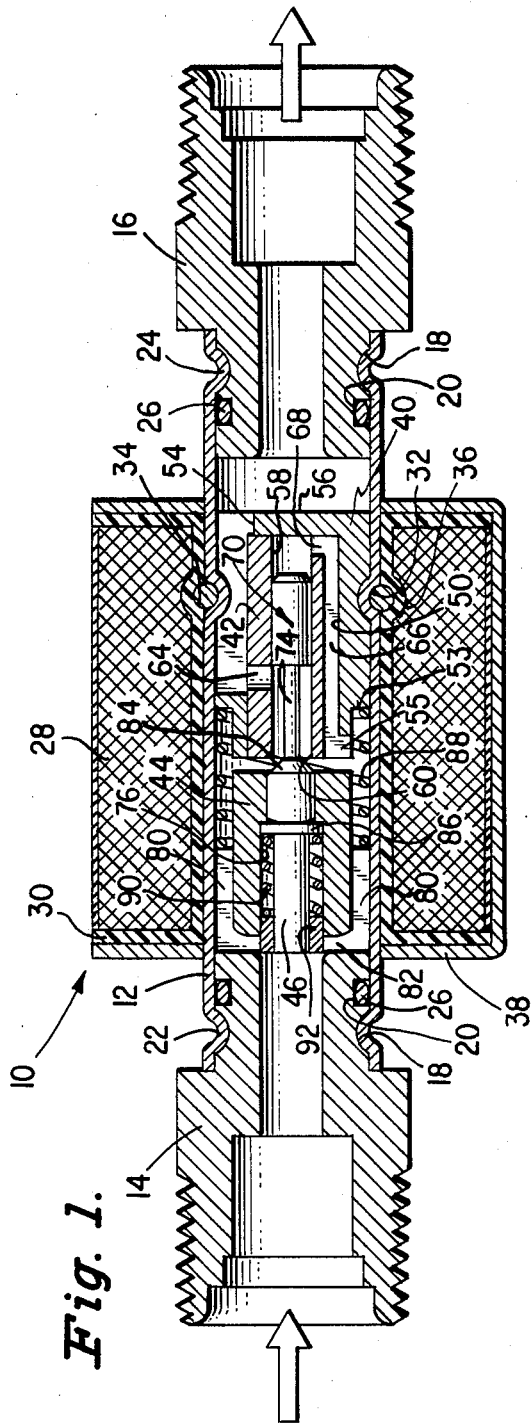
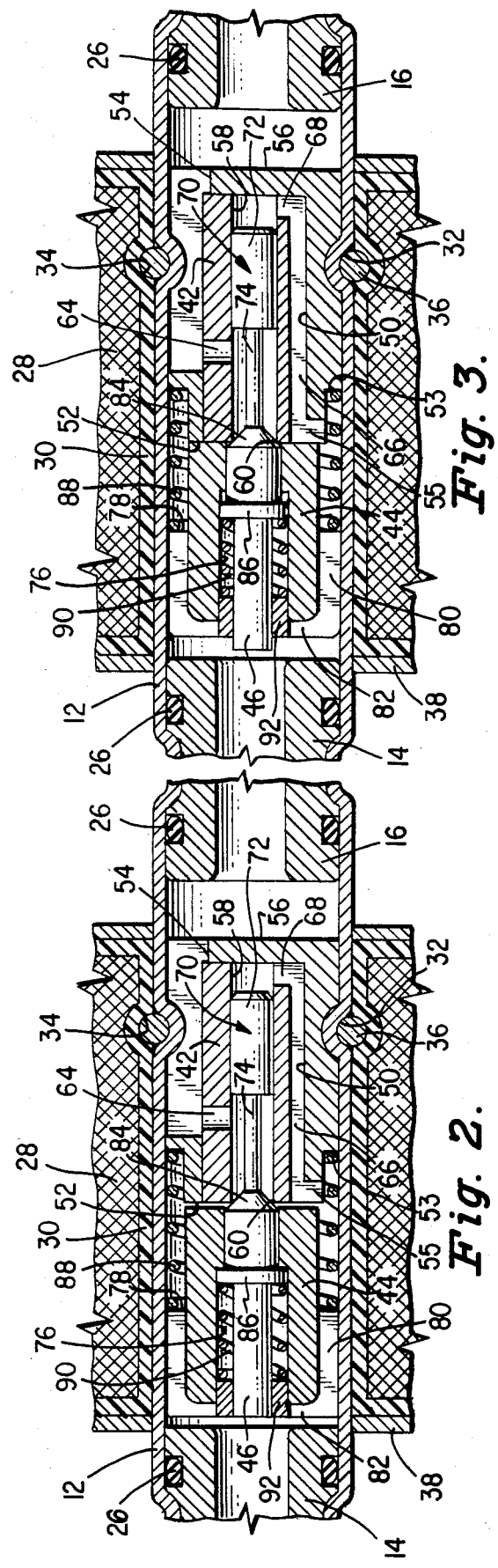
Fig. 1.
Fig. 2.
Fig. 3.

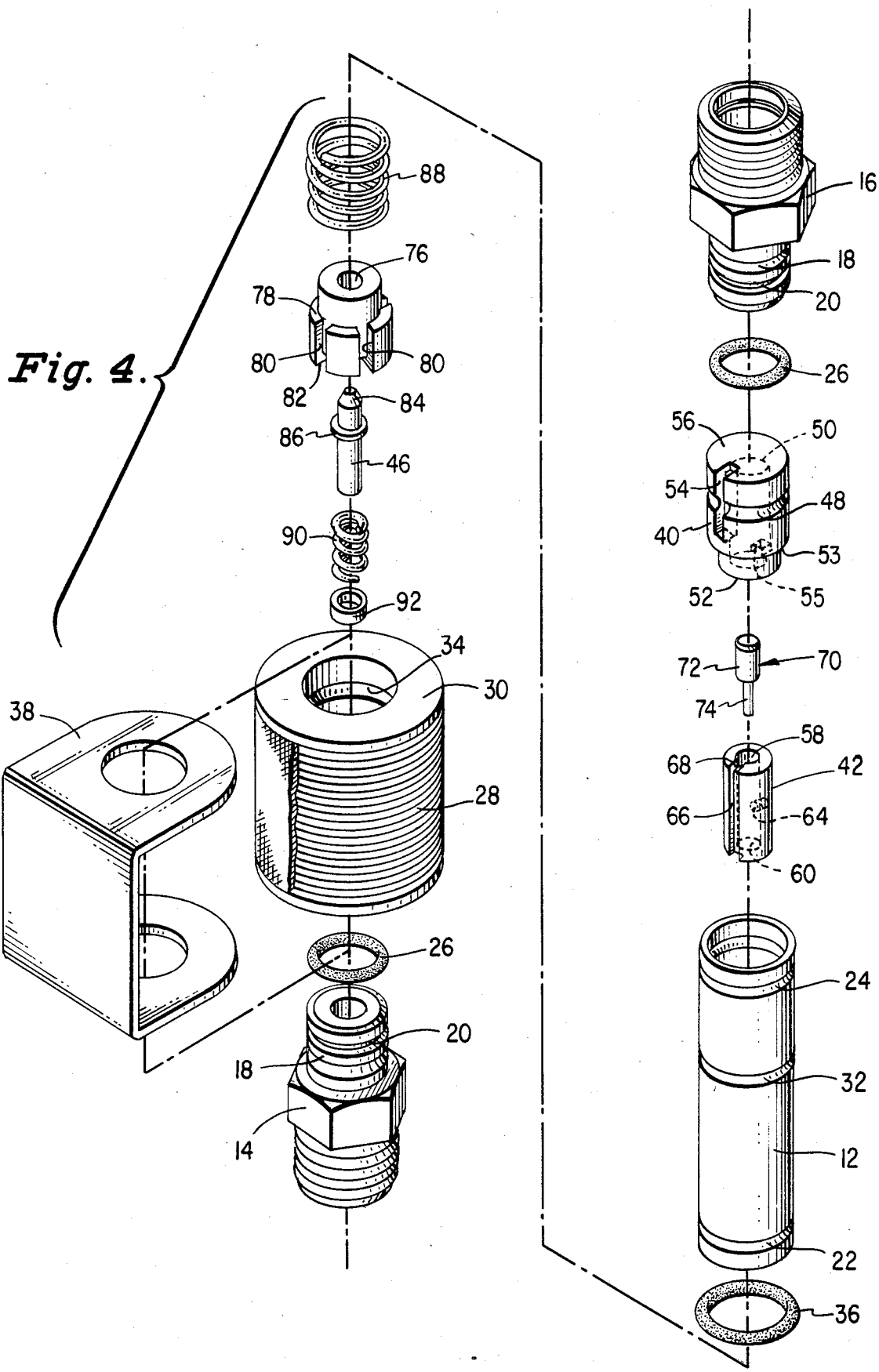

INLINE SOLENOID OPERATED VALVE

DESCRIPTION

1. Background of the Invention

This invention relates to solenoid operated valves and, more particularly, to such a valve wherein the solenoid surrounds the flow line and which is adapted for pulsed operation.

Automotive air conditioning systems in the past typically utilized either a thermostatic expansion valve or an orifice to control the flow of refrigerant to the evaporator. While such systems operated generally satisfactorily, the amount of control thereover was minimal. Since automotive control systems have become increasingly more sophisticated, with onboard microcomputers being provided for controlling such functions as engine speed, fuel flow, fuel mixture, transmission ratio, etc., it has been proposed to utilize an electrically operated expansion valve under control of the onboard microcomputer in the air conditioning system. Such valves are typically controlled in a pulse width modulated manner, which requires that the valves be pressure balanced to avoid placing an undue load on the automotive electrical system, which would occur if the valve operator had to open the valve under a differential pressure of at least 300 psi, which is typical in an automotive air conditioning application. Satisfactory results have been achieved in the past with a valve design wherein the solenoid extends outward at a right angle from the refrigerant fluid flow line with the motion of the solenoid plunger, which typically includes the valve member, being at right angles to the fluid flow. While such a valve operates in a satisfactory manner, under certain applications it is desirable to have what is referred to as an inline valve, where the control solenoid surrounds the flow line. Such a valve is advantageous because it results in a smaller overall package and its operation is quieter than a right angle valve. It is therefore an object of this invention to provide such a valve.

2. Summary of the Invention

The foregoing, and additional, objects are attained in accordance with the principles of this invention by providing an electrically operated fluid flow control comprising a hollow cylindrical valve sleeve; a pair of fittings mounted one on each end of the valve sleeve for coupling the valve into a fluid flow line; an electrical coil surrounding the valve sleeve between the fittings; a magnetic pole piece fixedly secured within the valve sleeve inside the region defined by the coil, the pole piece having an axially aligned bore extending part way into the pole piece from one end thereof and a longitudinal exterior channel extending from the other end of the pole piece along only a portion of the length thereof and intersecting the bore; a valve seat member press fit within the pole piece bore, the valve seat member having an axial bore therethrough open at both ends thereof, a valve seat at one end thereof, and an opening through its wall to provide communication between the valve seat member axial bore and the pole piece exterior channel; a magnetic plunger housing slidable within the valve sleeve member into and out of contact with one end of the pole piece, the plunger housing having an axial bore therethrough aligned with the pole piece bore and an exterior longitudinal channel; a magnetic plunger slidable within the plunger housing bore, the end of the plunger which faces the valve seat member being configured as a valve member to cooperate with the valve seat; first spring means for yieldably biasing the plunger housing away from the pole piece; second spring means for yieldably biasing the plunger outward from the plunger housing bore toward the valve seat member; and means for limiting the outward extension of the plunger from the plunger housing bore so that the valve member is out of contact with the valve seat when the coil is not energized.

BRIEF DESCRIPTION OF THE DRAWINGS

The foregoing will be more readily apparent upon reading the following description in conjunction with the drawings in which like elements in different figures thereof have the same reference character applied thereto and in which:

FIG. 1 is a longitudinal cross sectional view of an electrically operated valve according to the present invention, which the coil being deenergized;

FIG. 2 is a partial view similar to FIG. 1 showing the state of the valve shortly after the coil has been energized but prior to the final state of the valve after coil energization;

FIG. 3 is a view similar to FIG. 2 showing the final state of the valve after the coil has been energized; and FIG. 4 is an exploded perspective view of the valve of FIGS. 1-3.

DETAILED DESCRIPTION

Referring to the drawings, the valve shown therein and designated generally by the reference numeral 10 includes a hollow cylindrical valve sleeve 12 and a pair of fittings 14 and 16, one on each end of the valve sleeve 12, for coupling the valve 10 into a fluid flow line. To seal and secure the fittings 14 and 16 to the sleeve 12, each of the fittings is formed with a pair of adjacent annular grooves 18 and 20 and the sleeve 12 is deformed so as to have a pair of annular inwardly extending ribs 22 and 24. The grooves 20 of the fittings 14 and 16 each holds an O-ring 26 for sealing purposes and the ribs 22 and 24 are detented into the grooves 18.

The valve 10 also includes an electrical coil 28 wound on a bobbin 30 and surrounding the sleeve 12 between the fittings 14 and 16. The sleeve 12 is formed with an annular groove 32 and the bobbin 30 is formed with an internal annular groove 34. A split metal band (metal spring clip) 36 fits within the grooves 32 and 34 and acts as a detent for the bobbin 30 and the sleeve 12. As is conventional, a magnetic yoke 38 partially surrounds the coil 28 to provide a return path for the magnetic flux generated by the coil 28 when electrical current is passed therethrough.

The operative elements of the valve 10 are within the sleeve 12 and include a magnetic pole piece 40, a valve seat member 42, a magnetic plunger housing 44 and a magnetic plunger 46. The pole piece 40 is formed with an annular groove 48 which detents with the rib formed by the inside of the groove 32 on the sleeve 12 to securely fasten the pole piece 40 within the sleeve 12. Thus, the pole piece 40 is within the region defined by the coil 28 so it forms part of the magnetic flux path for the coil 28. The pole piece 40 is further formed with an axially aligned bore 50 which extends part way into the pole piece 40 from the end 52 thereof. The pole piece 40 is further formed with a longitudinal exterior channel 54 which extends from the other (closed) end 56 of the pole piece 40 only along a portion of the length of the pole piece 40. The exterior channel 54 intersects the axial bore 50 along a portion of its length. A transverse channel 55 extends along the end 52 from the bore 50 to the outer periphery of the pole piece 40. The pole piece 40 is also formed with a stepped exterior providing an abutment 53 facing the plunger housing 44.

The valve seat member 42 is press fit within the pole piece bore 50. The valve seat member 42 is formed with an axial bore 58 open at both ends and the sharp corner 60 where the bore 58 meets the end 62 of the valve seat member 42 functions as a valve seat for the valve 10, as will be described hereinafter. The valve seat member 42 is also formed with an opening 64 through its wall and extending from the bore 58 to the exterior of the valve seat member 42. An exterior channel 66 extends the length of the valve seat member 42 substantially opposite the opening 64 and a transverse channel 68 extends from the exterior channel 66 to the bore 58 at a point remote from the valve seat 60. Illustratively, the transverse channel 68 is at the end of the valve seat member 42.

A piston 70 is slidingly fitted within the valve seat member bore 50 between the valve seat 60 and the transverse channel 70. The piston 70 includes a head portion 72 and a stem portion 74, with the stem portion being closer to the valve seat 60. The size of the piston head 72 is controlled so that the total clearance between the piston head 72 and the axial bore 58 is smaller than the opening 64 so that, as will be described in full detail hereinafter, there is a smaller flow area provided by the clearance than by the opening 64.

The plunger housing 44 is slidable within the valve sleeve member 12 into and out of contact with the end 52 of the pole piece 40. The plunger housing 44 is formed with an axial bore 76 therethrough which is aligned with the pole piece bore 50. The plunger housing 44 is further formed with a stepped exterior providing an abutment 78 facing the pole piece 40. At least one exterior channel 80 is formed on the plunger housing 44 and extends from the end away from the pole piece 40 through the abutment 78. A transverse channel 82 extends from the end of the exterior channel 80 away from the abutment 78 to the axial bore 76 of the plunger housing 44. The axial bore 76 is stepped, with the smaller portion being closer to the pole piece 40.

The plunger 46 is slidable within the plunger housing bore 76. The end 84 of the plunger 46 which faces the valve seat 60 has a tapered configuration to enable it to act as a valve member to cooperate with the valve seat 60. The plunger 46 is further formed with an abutment 86 which cooperates with the step of the plunger housing bore 76 to limit the travel of the plunger 46 outward from the plunger housing 44 toward the valve seat 60 so that the valve member 84 does not contact the valve seat 60 when the coil 28 is not energized.

The valve 10 further includes a first helical compression spring 88, a second helical compression spring 90, and a ring member 92. The first spring 88 surrounds the smaller portions of the pole piece 40 and the plunger housing 44 between the pole piece abutment 53 and the plunger housing abutment 78. The ring member 92 is press fit within the plunger housing bore 76 at the end away from the pole piece 40. The ring member 92 surrounds the plunger 46 with clearance therebetween and the second spring 90 surrounds the plunger 46 between the plunger abutment 86 and the ring member 92.

The operation of the valve 10 is as follows. With the coil 28 not energized, the valve 10 is normally open, as shown in FIG. 1. Thus, the spring 88 acts to move the plunger housing 44 away from the pole piece 40 and the spring 90 urges the plunger 46 outward from the plunger housing 44 toward the valve seat 60, this motion being limited by the plunger abutment 86 contacting the step of the bore 76 to prevent the valve member 84 from contacting the valve seat 60. Fluid then flows through the fitting 14, through the transverse channel 82 of the plunger housing 44, through the exterior channel 80 of the plunger housing 44, past the plunger housing abutment 78, between the plunger housing 44 and the pole piece 40, past the valve seat 60, through the valve seat member axial bore 58, through the opening 64, through the pole piece exterior channel 54, and through the fitting 16. The flow is limited by the size of the opening 64. Upon energizing the coil 28, the plunger housing 44 and the plunger 46 are magnetically attracted to the pole piece 40 and the valve seat member 42, compressing the spring 88, as shown in FIG. 2. As the plunger 46 comes into contact with the valve seat 60, the spring 90 absorbs the impact shock, thus lowering the forces of the plunger 46 on the valve seat 60, increasing the life of the valve 10 and decreasing noise. Continued energization of the coil 28 causes the plunger housing 44 to further compress the spring 88 and continue moving until it contacts the pole piece 40, as shown in FIG. 3. However, the plunger 46 had previously contacted the valve seat 60 and this further movement of the plunger housing 44 causes the spring 90 to compress. Under these conditions, fluid flow is through the fitting 14, through the transverse channel 82 of the plunger housing 44, through the exterior channel 80 of the plunger housing 44, past the plunger housing abutment 78, through the transverse channel 55 of the pole piece 40, through the exterior channel 66 of the valve seat member 42, through the transverse channel 68 of the valve seat member 42, through the clearance between the piston 70 and the axial bore 58 of the valve seat member 42, through the opening 64, through the exterior channel 54 of the pole piece 40, and through the fitting 16. The flow is limited by the clearance between the piston 70 and the axial bore 58 of the valve seat member 42, since this clearance is less than the opening 60. With the valve 10 closed, as shown in FIG. 3, the piston stem 74 contacts the plunger 46 to provide a pressure balance which reduces the spring force needed for the spring 88 to open the valve 10 upon deenergization of the coil 28, which in turn reduces the coil strength needed to overcome the spring forces exerted by the spring 88. Thus, this valve is suitable for pulsed operation.

Accordingly, there has been disclosed an improved inline solenoid operated valve. It is understood that the above-described embodiment is merely illustrative of the application of the principles of this invention. Numerous other embodiments may be devised by those skilled in the art without departing from the spirit and scope of this invention as defined by the appended claims.

I claim:

1. An electrically operated fluid flow valve, comprising:

a hollow cylindrical valve sleeve;

a pair of fittings mounted one on each end of said valve sleeve for coupling the valve into a fluid flow line;

an electrical coil surrounding said valve sleeve between said fittings;

a magnetic pole piece fixedly secured within said valve sleeve inside the region defined by said coil, said pole piece having an axially aligned bore extending part way into said pole piece from one end thereof and a longitudinal exterior channel extending from the other end of said pole piece along only a portion of the length thereof and intersecting said bore;

a valve seat member press fit within said pole piece bore, said valve seat member having an axial bore therethrough open at both ends thereof, a valve seat at one end thereof, and an opening through its wall to provide communication between said valve seat member axial bore and said pole piece exterior channel;

a magnetic plunger housing slidable within said valve sleeve member into and out of contact with said one end of said pole piece, said plunger housing having an axial bore therethrough aligned with said pole piece bore and an exterior longitudinal channel;

a magnetic plunger slidable within said plunger housing bore, the end of said plunger which faces said valve seat member being configured as a valve member to cooperate with said valve seat;

first spring means for yieldably biasing said plunger housing away from said pole piece;

second spring means for yieldably biasing said plunger outward from said plunger housing bore toward said valve seat member; and means for limiting the outward extension of said plunger from said plunger housing bore so that said valve member is out of contact with said valve seat when said coil is not energized.

2. The valve according to claim 1 wherein said valve seat member further has an exterior channel extending the length thereof substantially opposite said opening and a transverse channel extending from said exterior channel to said valve seat member axial bore at a point remote from said valve seat, said pole piece is formed with a transverse channel on its end adjacent said plunger housing extending from its exterior to its axial bore and communicating with said valve seat member exterior channel, and said valve further includes a piston slidingly fitted within said valve seat member axial bore between said valve seat and said transverse channel, said piston including a stem portion closer to said valve seat, said stem portion adapted to contact said plunger for transmitting pressure balancing forces thereto when said coil is energized and wherein a controlled minimum flow path is provided by the clearance between said piston and said valve seat member axial bore, said clearance providing a smaller flow area than said valve seat member opening.

3. The valve according to claim 1 wherein said pole piece is formed with an abutment thereon facing said plunger housing, said plunger housing is formed with an abutment thereon facing said pole piece, and said first spring means includes a compression spring surrounding said pole piece and said plunger housing between said pole piece abutment and said plunger housing abutment.

4. The valve according to claim 1 further including a ring member press fit within said plunger housing bore at the end away from said pole piece and surrounding said plunger with clearance therebetween, and wherein said plunger housing bore is stepped with the smaller portion being closer to said valve seat member, said plunger extension limiting means includes an abutment on said plunger within the larger portion of said plunger housing bore and cooperating with the step of said plunger housing bore, and said second spring means includes a compression spring surrounding said plunger between said abutment and said ring member.

* * * * *